R. McGLAUGHLIN.
COMBINED AXLE LUBRICATING DEVICE AND NUT LOCK.
APPLICATION FILED AUG. 20, 1915.
1,231,180. Patented June 26, 1917.
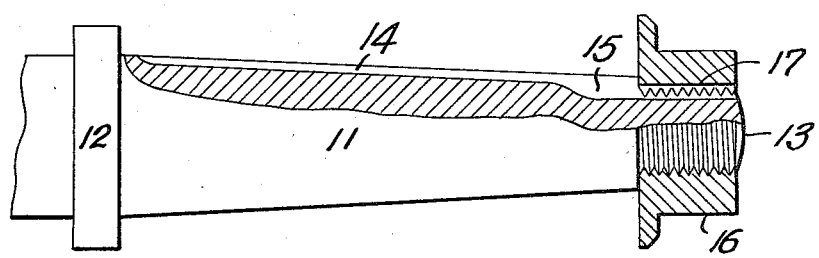
FIG. 1.
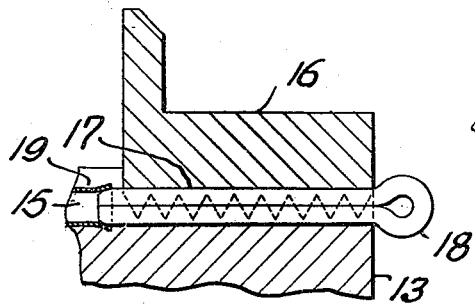 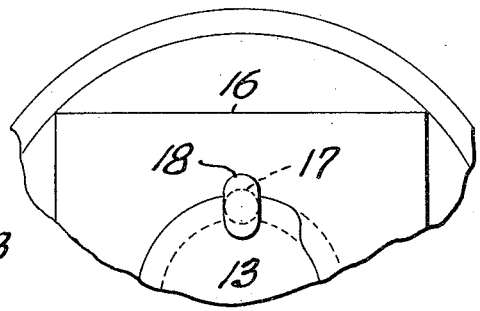
FIG. 2. FIG. 3.
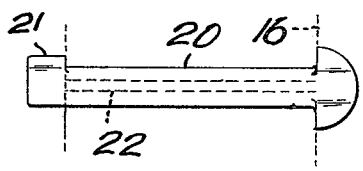
FIG. 4.
Witnesses
Inventor
R. McGlaughlin
By
Attorneys

UNITED STATES PATENT OFFICE.

ROBERT McGLAUGHLIN, OF MONTREAL, QUEBEC, CANADA.

COMBINED AXLE-LUBRICATING DEVICE AND NUT-LOCK.

1,231,180.  Specification of Letters Patent.  Patented June 26, 1917.

Application filed August 20, 1915. Serial No. 46,454.

*To all whom it may concern:*

Be it known that I, ROBERT MCGLAUGHLIN, a citizen of the Dominion of Canada, and resident of the city of Montreal, in the Province of Quebec and Dominion of Canada, have invented certain new and useful Improvements in Combined Axle-Lubricating Devices and Nut-Locks, of which the following is a full, clear, and exact description.

This invention relates to improvements in combined axle lubricating device and nut lock, and the object of the invention is to provide a simple and efficient means for lubricating an axle and at the same time preventing the escape of lubricant and the loosening of the nut.

The device consists essentially of an axle having a lubricant channel formed in the bearing portion thereof, extended through the threaded nut engaging portion. A groove is also formed in the nut adapted to register with the axle groove when the nut is screwed up tight for the reception of a pin, which both retains the lubricant in the groove and holds the nut against loosening.

In the drawings which illustrate the invention:—

Figure 1 is a side elevation partly in section of the end of an axle formed according to this invention.

Fig. 2 is an enlarged fragmentary sectional view similar to Fig. 1, showing the pin in place.

Fig. 3 is a fragmentary end elevation showing the pin in place.

Fig. 4 shows an alternative form of pin.

Referring more particularly to the drawings, 11 designates the bearing portion of an axle extending from the shoulder 12 to the threaded nut engaging portion 13. A groove 14 is formed in the bearing portion of the axle extending from near the shoulder to the extremity of the threaded portion, and if the design of the axle so requires, stepped down adjacent the threaded portion, as shown at 15. The wheel retaining nut 16 is provided with a groove 17 traversing the threads thereof and positioned to register with the groove 14 when the nut is screwed up tight, so as to form a passage, preferably circular in cross section, communicating with the groove 14. It will be readily seen that any solid obstruction in this passage will hold the nut against turning on the axle. A pin 18, preferably of the split variety, is inserted in the passage and forms a complete closure therefor. The split pin is preferred because the arms thereof may be slightly sprung apart before insertion, so as to grip the walls of the passage on insertion and hold the pin against working out. If desired, a lubricant holding tube 19 may be seated in the groove, as shown in Fig. 2, and the end thereof closed by the pin when the same is inserted.

A solid pin, designated 20, may be used instead of the split pin 18, such a pin being provided with a ward or fin on one side at the end, which will travel through a groove 22 formed in the wall of the bore 17. When the pin has been inserted, it is given a partial rotation, which brings the ward out of register with the groove and thus locks the pin in position.

The operation of the device is extremely simple. When it is desired to lubricate the axle, the pin 18 is withdrawn and lubricant inserted by means of an oil can or grease gun to fill the groove 14. The pin is then reinserted, and if at all loose, may be readily tightened by slightly springing its arms apart before insertion. It will thus be seen that the axle and wheel may be lubricated without the necessity of unscrewing the nut and removing the wheel, and also that the pin performs the double function of retaining the lubricant in the groove and holding the nut against working loose and eventually dropping off.

While the split pin is preferred on account of its simplicity, cheapness and efficiency, it is obvious that any other species of pin may be used without departing from the spirit of the invention, and also that the same result may be obtained by inserting radially of the nut a pin of sufficient size to block the passage.

Having thus described my invention, what I claim is:—

1. In a device of the character described, in combination an axle having a lubricant channel, a nut thereon, and a pin inserted through the nut into the entrance of said channel arranged to retain lubricant therein.

2. In a device of the character described, in combination an axle having a lubricant channel, a nut thereon, a lubricant tube in said channel, and a pin inserted through the nut into the entrance of said tube for holding lubricant therein.

3. In a device of the character described, in combination an axle having a shoulder and a threaded portion with a bearing surface therebetween and a lubricant channel formed in the bearing portion and extending from near the shoulder to the extremity of the threaded portion, a nut screwed on said threaded portion having a groove formed therein adapted to register with that part of the channel in the threaded portion and to form therewith a passage circular in cross section, and a pin inserted in said passage arranged to completely close the same, retaining lubricant in the channel and holding the nut against revolution on the axle.

4. In a device of the character described, in combination an axle having a lubricant channel, a nut thereon, a pin inserted in said channel to retain lubricant therein and hold the nut against revolution on the axle, said pin being provided with an integral part for holding the pin against displacement.

5. In a device of the character described, in combination an axle having a lubricant channel, a nut thereon, a pin inserted through the nut and into the entrance of said channel, and means for holding the pin against displacement comprising a fin on the extremity of the pin.

In witness whereof, I have hereunto set my hand, in presence of two witnesses.

ROBERT McGLAUGHLIN.

Witnesses:
L. ELFMAN,
SARA M. GLADSTONE.

Copies of this patent may be obtained for five cents each, by addressing the "Commissioner of Patents, Washington, D. C."